United States Patent [19]

Ueyama

[11] Patent Number: 4,908,647
[45] Date of Patent: Mar. 13, 1990

[54] LENS DRIVING DEVICE

[75] Inventor: Masayuki Ueyama, Osaka, Japan

[73] Assignee: Minolta Camera Kabushiki Kaisha, Osaka, Japan

[21] Appl. No.: 346,217

[22] Filed: May 2, 1989

[30] Foreign Application Priority Data

May 6, 1988 [JP] Japan ................................ 63-110970

[51] Int. Cl.$^4$ .............................................. E03B 3/10
[52] U.S. Cl. .................................. 354/402; 354/195.1
[58] Field of Search ............. 354/400, 195.1, 401–409; 250/201, 204; 355/55, 56; 358/225, 227

[56] References Cited

U.S. PATENT DOCUMENTS 4,537,487  8/1985  Taniguchi et al. .................. 354/400
4,783,676  11/1988  Aihara et al. ....................... 354/400

FOREIGN PATENT DOCUMENTS 52-115217  7/1977  Japan .
58-102220  6/1983  Japan .
59-106009  6/1984  Japan .
62-265632  11/1987  Japan .
63-285522  11/1988  Japan .

Primary Examiner—L. T. Hix
Assistant Examiner—David M. Gray
Attorney, Agent, or Firm—Burns, Doane, Swecker & Mathis

[57] ABSTRACT

A lens driving device is for driving a focusing lens to stop the focusing lens at a desired position. The device comprises means including a driving mechanism having a backlash, for driving the focusing lens along the optical axis thereof; means for detecting a moving direction of the focusing lens; means for storing a reference position of the focusing lens; means for storing a moving direction of the focusing lens immediately before the focusing lens is stopped at the reference position; means for comparing a present moving direction according to the moving direction detecting means with the stored moving direction; and means for controlling the driving means so that the focusing lens moves through the desired position by a predetermined amount not less than the amount of the backlash, and the focusing lens reversely moves by the predetermined amount when said comparing means detects the present moving direction is different from the stored moving direction.

6 Claims, 9 Drawing Sheets

LENS DRIVING DEVICE

BACKGROUND OF THE INVENTION AND RELATED ART STATEMENT

The present invention relates to a lens driving device for a camera and, more particularly, to a device for correcting a position control error caused by a backlash of a driving mechanism between a lens and a driving means provided for driving the lens.

A plurality kind of backlash correction is disclosed in Japanese Patent Laid-Open Application No. 106009/1984 and Japanese Patent Laid-Open Application No. 115217/1977.

In the former application, a device is proposed in which a direction of a torque generated by a driving motor is detected and a start point of a backlash correction is determined in response to reversing timing of the torque. By this correction, the backlash is corrected in deceleration (braking) after acceleration. Although this correction is suitable for a device such as a machine tool, having a driven member with high inertia, it is not suitable for a device such as a camera having a driven member with low inertia such as a lens. The reason is that the direction of the backlash is not changed in deceleration of the torque of the driving motor, because the inertia of the lens is about 1/10–1/100 lower than that of the driving motor and viscous resistance material such as grease is used in a driving mechanism. Therefore, it is difficult to apply the backlash correction disclosed in the former application to cameras.

In the latter application, a device is proposed in which an optical system is stopped at one of a plurality of predetermined positions only when the system is moving in a specific direction. It can not be applied to a device in which the stop positions can be optionally set, because the stop positions are predetermined in the device of the latter application. Further, the optical system of the latter application moves or is driven only in one direction, so that controlling the device is strongly restricted.

Meanwhile, a camera needs lens position control with an output of a detector provided for detecting a lens position through an automaticfocus (AF) coupler provided between the lens and the driving means. However, a large backlash exists in the AF coupler because the coupler is mounted in a driving mechanism between the detector and the lens. Therefore, accurate control of the lens becomes insufficient so that a picture may be taken in out-of-focus condition.

SUMMARY OF THE INVENTION

It is an object of the present invention to provide a lens driving device in which a lens can be positioned accurately in spite of existence of a backlash.

It is another object of the present invention to provide a lens driving device suitable for accurate automatic focusing cameras.

A lens driving device according to the present invention is for driving a focusing lens to stop the focusing lens at a desired position. The device comprises means, including a driving mechanism having a backlash, for driving the focusing lens along an optical axis thereof; means for detecting a moving direction of the focusing lens; means for storing a reference position of the focusing lens; means for storing a moving direction of the focusing lens immediately before the focusing lens is stopped at the reference position; means for comparing a present moving direction according to the moving direction detecting means with the stored moving direction; and means for controlling the driving means so that the focusing lens moves through the desired position by a predetermined amount not less than the amount of the backlash, and the focusing lens reversely moves by the predetermined amount when said comparing means detects that the present moving direction is different from the stored moving direction.

The driving means or lens driving mechanism has an appropriate friction torque. Further, the moments of the inertia of the lens and the lens driving mechanism are sufficiently smaller than that of a motor on the basis of drive shaft torque of a motor. Since the lens is driven over the desired position and then reversely driven, the backlash exists only in one side of each engagement whenever the lens stops, whereby the device can be accurately controlled in spite of the backlash.

The foregoing and other new advantageous features of the invention are described in detail below and set out in the appended claims.

DETAILED DESCRIPTION OF THE PREFERRED EMBODIMENT OF THE INVENTION

Figure 1:
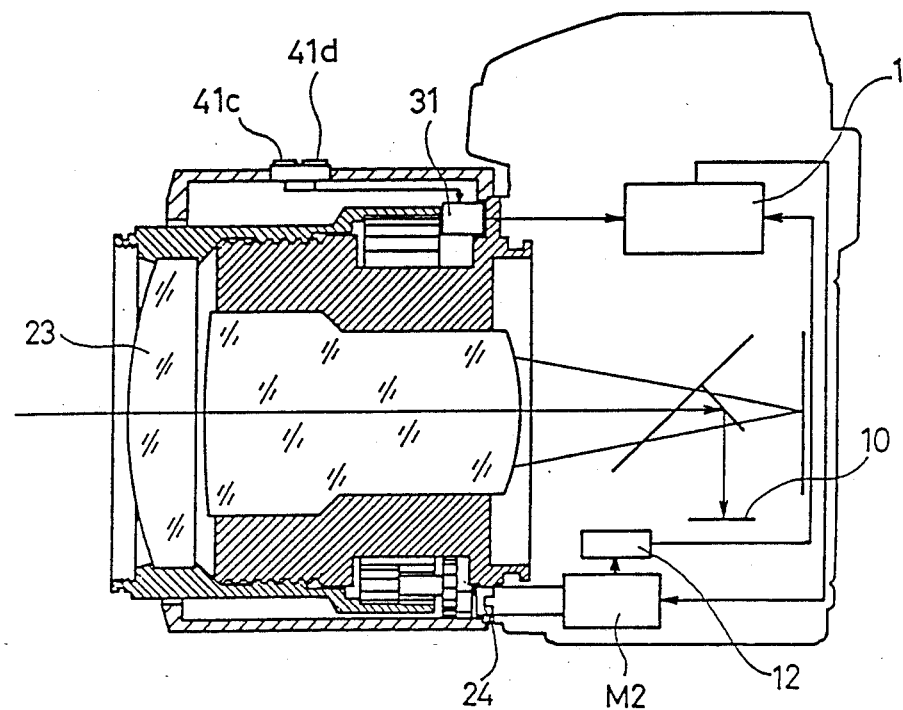
FIG. 1 is a schematic sectional side view showing a camera provided with a lens driving device according to the present invention.

A camera having a focus memory means in accordance with an embodiment of the present invention will now be described with reference to accompanying drawings. FIG. 1 shows a schematic view showing a camera having a lens driving device of the present invention. In a camera body, there are a microcomputer 1 described below, a CCD 10 as an AF sensor, a motor M2 for driving a lens, and a pulse encoder 12 for monitoring the rotation of the motor M2 as a position detecting means for detecting a lens position. In a lens, there are a focusing lens 23, an AF coupler 24 in a driving mechanism between a lens and the camera body, a ROM 31 described below in detail, a memory-call switch 41c and a memory switch 41d.

The memory-call switch 41c and the memory switch 41d function as follows: When the memory switch 41d is pushed after the lens is focused on an object, the microcomputer 1 memorizes the lens position. Thereafter, when the memory-call switch 41c is pressed, the lens is automatically positioned at the memorized lens position. This memorized position is referred to as a reference position in the following description.

Figure 2:
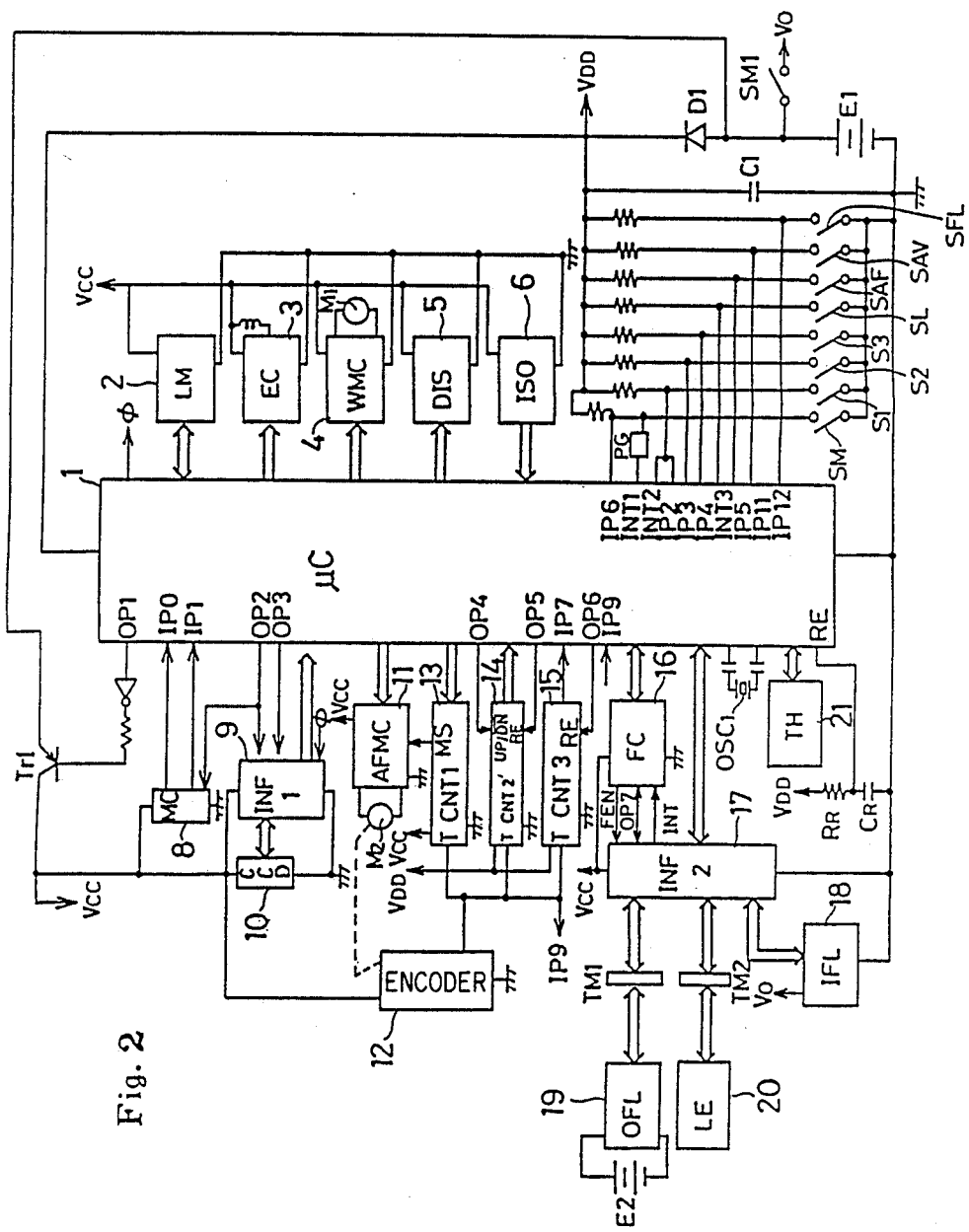
FIG. 2 is a diagram showing a circuit of the camera.

FIG. 2 is a block diagram showing a circuit of the camera of the embodiment.

In FIG. 2, the microcomputer 1 executes a sequence control of the camera and a plurality kinds of calculations, and includes a control circuit for driving the lens 5 as described below. A photometry circuit 2 measures a brightness of an object to be photographed to send a digital signal indicative of the measured brightness value (Bv value) represented in APEX system to the microcomputer 1.

An exposure control circuit 3 is for controlling a diaphragm and a shutter with a diaphragm aperture value and a shutter speed which are predetermined or calculated by the microcomputer 1. A winding circuit 4 actuates a motor M1 to wind a film by one frame. A display circuit or display device 5 is for displaying a plurality kinds of photographic information. A film sensitivity setting circuit 6 is for outputting a digital signal indicative of a film sensitivity represented in APEX system which is set manually or obtained by automatically reading a code pattern provided on a film cartridge. Circuits 8–13 are provided for automatic focusing operation (AF). The monitor circuit 8 is provided for controlling an integration time of the CCD 10 served as an image sensor, and outputs a request signal for terminating the integration of the CCD 10 and a low brightness signal to input terminals IP0, IP1 of the microcomputer 1, respectively. The interface circuit 9 receives an integration start signal and an integration completion signal from output terminals OP2, OP3 of the microcomputer 1 respectively, and controls the integration time of the CCD 10, and converts alanog data produced by the CCD 10 into digital data to output it to the microcomputer 1. The motor control circuit 11 controls the motor M2 which drives a focus lens 23 through the coupler 24 serves as a lens driving mechanism. The encoder 12 or a position detecting means monitors rotation of the motor M2 and generates a pulse corresponding to the motor rotation. The counter 13 is provided for controlling the number of rotation of the lens driving motor M2 or the amount thereof. This counter 13 is set to the number or amount corresponding to a defocus amount calculated by the microcomputer 1 and then decrements the set number in each time it receives a pulse from the encoder 12. When the number becomes zero, the counter 13 outputs a stop signal from a terminal MS to the motor control circuit 11 in order to stop the lens driving motor M2.

A register 14 is provided for storing the contents of the following counter 16 when the focus memory switch 41d turns on. A flip-flop 15 is provided for storing a moving direction of the focusing lens 23.

An up-down counter 16 is provided for monitoring a displacement of the focusing lens 23 from an infinity focusing position of the focusing lens 23. The counter 16 counts up a pulse from the encoder 12 when the lens moves forward, whereas it counts down the pulse when the lens moves backward. A counter 17 is provided for counting pulses outputted from the encoder 12, the counting of the counter 17 being started in a condition in which the focusing lens 23 is located at its infinity focusing position. The counter 17 outputs a carry signal to an input terminal IP7 of the microcomputer 1 when its count number becomes over a predetermined number. By its monitoring the count number and outputting the carry signal, an error between the number in the counter 16 for monitoring the displacement of the focusing lens and an actual displacement of the focusing lens due to a play between the lens driving mechanism and the coupler or a little error between one pulse from the encoder 12 and the actual displacement of the lens, can be made small. The reason of carrying out the above is that the error might be larger in proportion to the number of rotation of the motor M2. The camera is further provided with a flash control circuit 18 for controlling flash amount light emitted by a flash device, a built-in flash device 20, a flash device 21 mounted on the camera and an interface circuit 19 provided between a circuit 22 in an interchangeable lens LE and the microcomputer 1.

Figure 3:
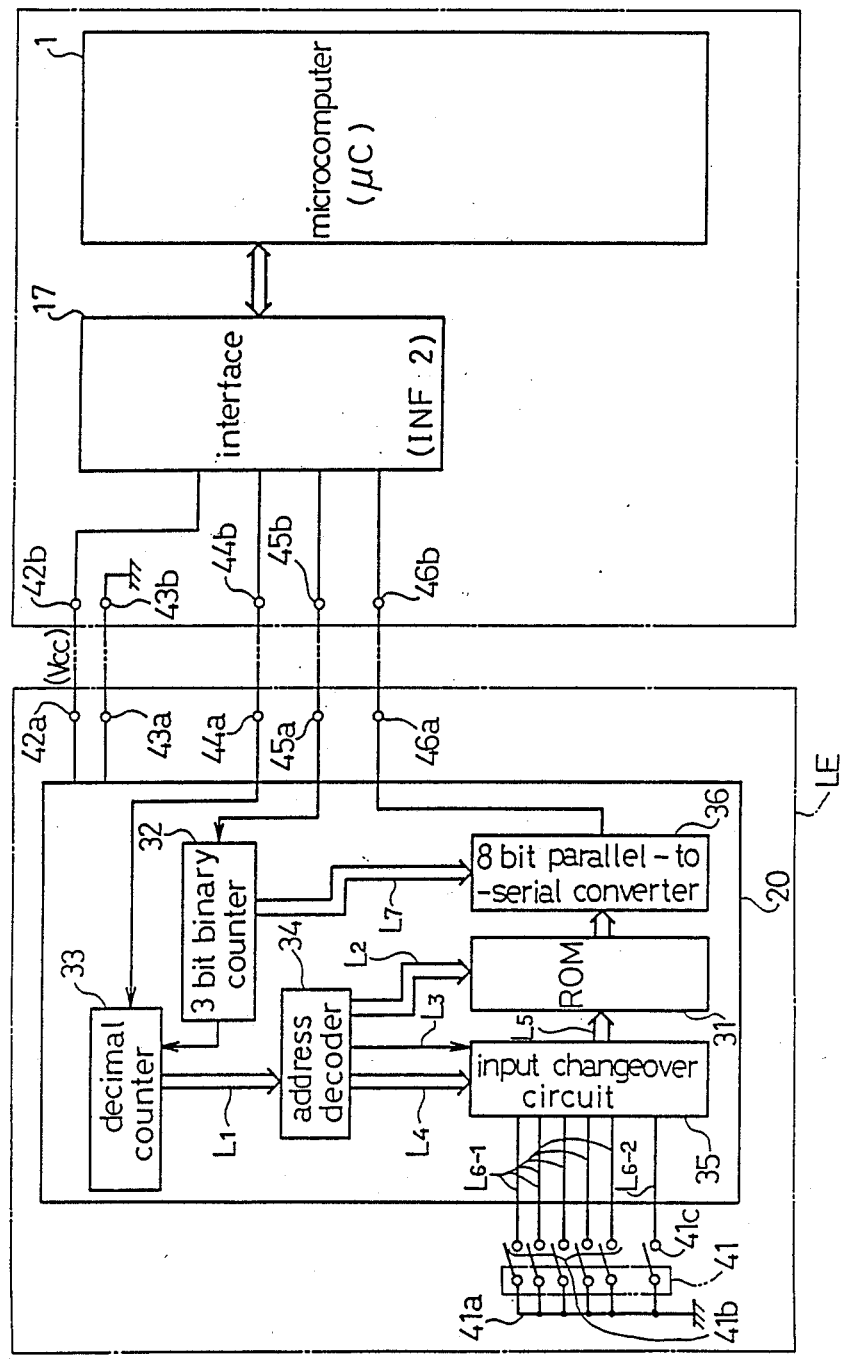
FIG. 3 is a diagram showing a circuit in direct relation to a lens of the camera.

FIG. 3 shows detail structure of the circuit 22 provided in the interchangeable lens LE.

In FIG. 3, the circuit 22 provided in the interchangeable lens LE includes a ROM 31, 3-bit binary counter 32, a decimal counter 33, an address decoder 34, an input switching circuit 35 and 8-bit parallel-serial conversion circuit 36.

When the microcomputer 1 reads data stored in the interchangeable lens LE, the interface circuit 19 (INF2) causes a reset signal to fall from 1 to 0 through signal contacts 44a, 44b so that the decimal counter 33 is reset to be zero. Then, the interface circuit 19 outputs clock pulses through signal contacts 45a, 45b. The 3-bit binary counter 32 outputs one pulse to the decimal counter 33 every time when it receives 8 clock pulses. Further, the counter 32 controls output timing of the data information of the interchangeable lens LE which is serially outputted from the 8-bit parallel-serial converting circuit 36.

The decimal counter 33 outputs signals $L_1$ shown in Table I to the address decoder 34, corresponding to pulses inputted from the 3-bit binary counters 32.

TABLE I

| Number of pulses input to counter 33 | Output Signal $L_1$ |
|---|---|
| 1 | 0 0 0 0 |
| 2 | 0 0 0 1 |
| 3 | 0 0 1 0 |
| 4 | 0 0 1 1 |
| 5 | 0 1 0 0 |
| 6 | 0 1 0 1 |
| 7 | 0 1 1 0 |
| 8 | 0 1 1 1 |
| 9 | 1 0 0 0 |
| 10 | 1 0 0 1 |

In accordance with the information of the output signals $L_1$, the address decoder 34 outputs an output signal $L_2$ for designating an address in the ROM 31 to the ROM 31 and another output signal $L_4$ to the input switching circuit 35. The output signal $L_2$ is assigned to the upper 3 bits of an address signal of 8-bit, whereas the output signal $L_4$ is assigned to the lower 5 bits of the address signal.

The lower 5 bits of the address signal may be assigned with external signals $L_{6-1}$, $L_{6-2}$. The external signal $L_{6-1}$ corresponds to a focal length of the lens system in the case that the interchangeable lens LE is a zoom lens. This external signal $L_{6-1}$ is produced from a zoom encoder contacts 41b in accordance with the operation of a zoom ring 41. When a fixed focus length lens is used, all the contacts by 41b are disconnected to the grounded encoder contacts 41a. Another external signal $L_{6-2}$ is produced from the memory-call switch 41c and the memory switch 41d described below. Assignment information $L_4$, $L_6$ of the lower 5 bits of the address signal is switched in the input switching circuit 35 in accordance with the output signal $L_3$ of the address decoder 34. Then, an output signal $L_5$ of the input switching circuit 35 is finally assigned to the lower $L_5$ bits of the address signal.

Table II shows input and output signals of the address decoder 34 and the input switching circuit 35.

TABLE II

| $L_1$ | $L_2$ | $L_3$ | $L_4$ | $L_{6-1}$ | $L_{6-2}$ | $L_5$ |
|---|---|---|---|---|---|---|
| 0 0 0 0 | 0 0 0 | 0 0 | 0 0 0 0 0 | $a_3a_2a_1a_0$ | $b_1b_0$ | 0 0 0 0 0 |
| 0 0 0 1 | 0 0 1 | 0 1 | 0 0 0 0 1 | $a_3a_2a_1a_0$ | $b_1b_0$ | $0a_3a_2a_1a_0$ |
| 0 0 1 0 | 0 1 0 | 0 1 | 0 0 0 1 0 | $a_3a_2a_1a_0$ | $b_1b_0$ | $0a_3a_2a_1a_0$ |
| 0 0 1 1 | 0 0 0 | 0 0 | 0 0 0 1 1 | $a_3a_2a_1a_0$ | $b_1b_0$ | 0 0 0 1 1 |
| 0 1 0 0 | 0 1 1 | 0 1 | 0 0 1 0 0 | $a_3a_2a_1a_0$ | $b_1b_0$ | $0a_3a_2a_1a_0$ |
| 0 1 0 1 | 0 0 0 | 0 0 | 0 0 1 0 1 | $a_3a_2a_1a_0$ | $b_1b_0$ | 0 0 1 0 1 |
| 0 1 1 0 | 0 0 0 | 1 0 | 0 0 1 1 0 | $a_3a_2a_1a_0$ | $b_1b_0$ | 0 0 1 1 $b_0$ |
| 0 1 1 1 | 1 0 0 | 0 1 | 0 0 1 1 1 | $a_3a_2a_1a_0$ | $b_1b_0$ | $0a_3a_2a_1a_0$ |
| 1 0 0 0 | 0 0 0 | 1 1 | 0 1 0 0 0 | $a_3a_2a_1a_0$ | $b_1b_0$ | 0 1 0 $b_1b_0$ |
| 1 0 0 1 | 0 0 0 | 0 0 | 0 1 1 0 0 | $a_3a_2a_1a_0$ | $b_1b_0$ | 0 1 1 0 0 |

In this table, $a_0, a_1, \ldots a_3, b_0$ and $b_1$ designate "0" or "1".

As can be seen, $L_5=L_4$ when $L_3=$ "00". $L_5=L_{6-1}$ when $L_3=$ "01", and $L_5$ is assigned to lower 5 bits of the address signal. When $L_3=$ "10", only the lowest bit depends upon the lowest bit of $L_{6-2}$, whereas $L_5=L_4$ with regard to the lower 5-2 bits. When $L_3=$ "11", the first and second lower bits depends upon the external signal $L_{6-2}$, whereas $L_5=L_4$ with regard to the third to the fifth lower bits.

Table III shows information stored in the ROM 31 of the circuit 22.

TABLE III

| $L_1$ | Upper 3 bits $L_2$ | Lower 5 bits $L_5$ | Information |
|---|---|---|---|
| 0 0 0 0 | 0 0 0 | 0 0 0 0 0 | Incomplete mounting check code |
| 0 0 0 1 | 0 0 1 | 0 $a_3a_2a_1a_0$ | Minimum F-number |
| 0 0 1 0 | 0 1 0 | 0 $a_3a_2a_1a_0$ | Maximum F-number |
| 0 0 1 1 | 0 0 0 | 0 0 0 1 1 | Light measuring error correction data |
| 0 1 0 0 | 0 1 1 | 0 $a_3a_2a_1a_0$ | focal length f |
| 0 1 0 1 | 0 0 0 | 0 0 1 0 1 | Minimum F-number for the AF operation |
| 0 1 1 0 | 0 0 0 | 0 0 1 1 $b_0$ | AF/MF information |
| 0 1 1 1 | 1 0 0 | 0 $a_3a_2a_1a_0$ | Lens movement amount converting coefficient K |
| 1 0 0 0 | 0 0 0 | 0 1 0 $b_1b_0$ | LSW |
| 1 0 0 1 | 0 0 0 | 0 1 1 0 0 | BL |

Referring to FIG. 2, switches will be described. SM designates a main switch. Unless the switch SM is turned on, the microcomputer 1 would not accept a signal from a photographing preparation switch S1 described below. Turning off or turning on of the main switch SM causes a pulse producing circuit PG to produce a pulse. As the pulse is inputted, the microcomputer 1 commands the control circuit 11 to move the focusing lens to the infinity focusing position and resets the counters 16, 17, whereby the counters correspond to the lens position.

When the photographing preparation switch S1 is turned on by the first stroke of a release button, the photometry circuit 2 starts the light measurement. When a release switch S2 is turned on by the second stroke of the release button under the predetermined condition, exposure control is carried out. A timing switch S3 is turned on when a travelling of a second curtain in a focal plane shutter is completed and is turned off when a release mechanism is charged by the winding motor M1.

SL designates a lens attaching switch which is turned on when the lens is attached. Turning on the switch SL, the microcomputer 1 causes the lens to move its infinity focusing position is a similar way when the switch SM is operated, SAF designates a switch for switching from the automatic focusing AF or the manual focusing MF to the other. SM1 designates a switch which turns on or off with the main switch SM. Through the switch SM1, a battery E1 supplies the built-in flash device 20 with electric power. SAV designates an automatic exposure switch which is turned on when the automatic exposure mode is set. SFL designates a flash light photographing switch which is turned on when a daylight photographing mode is replaced by a flash light photographing mode.

With regard to power sources, the battery E1 supplies a camera with electric power $V_{DD}$. Specifically, this battery E1 supplies the built-in flash device 20 with electric power $V_0$. A capacitor C1 is used for a backup of the microcomputer 1. A diode D1 prevents the backup capacitor C1 from discharging electricity to the battery E1. Electricity is directly supplied to pull-up registers of the switches, the microcomputer 1 and the counters CNT2, CNT3. A power supply transistor Tr1 supplies other devices with electric power $V_{CC}$.

The information LSW of the memory-call switch and the memory switch, the backlash amount BL, the K value and the f value shown in Table III are inputted to the microcomputer 1 through the interface circuit 19. The K value is a counter pulse number in an unit of the defocus amount. The K value of a zom lens is in inverse proportion to the square of focal length of the zoom lens.

The switches 41c, 41d of the external signal $L_{6-2}$ connected to the input switching circuit 35 in FIG. 3 are shown also in FIG. 1 as memory-call switch and memory switch, respectively. Input signals through the switches 41c, 41d correspond to $b_0$, $b_1$ in Table II. The address signals $L_5$ subjected to positions of the switches 41c, 41d and signals of the switch information LSW in Table III selected by the address signals $L_5$ are shown in Table IV. The contents of Table IV are stored at corresponding address in the ROM 31.

Figure 4:
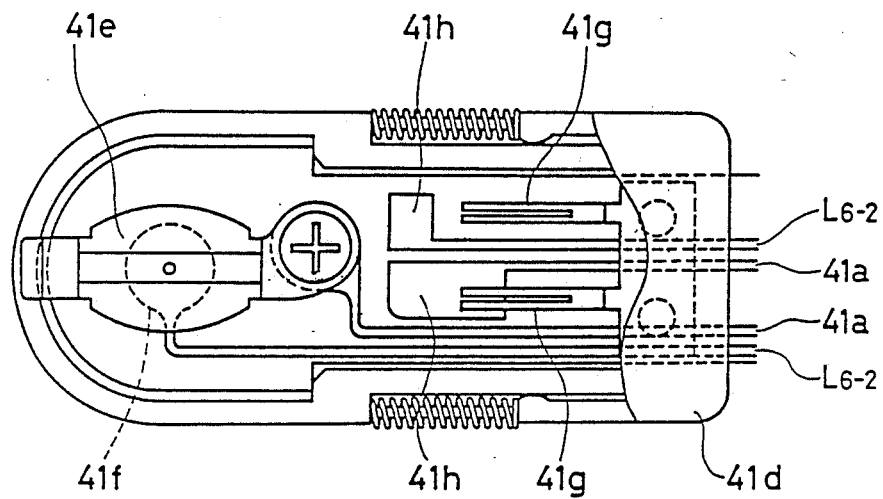
FIGS. 4(a) to 4(c) are a plan view, a sectional side view and a front view, respectively, showing a switch.
Figure 4:
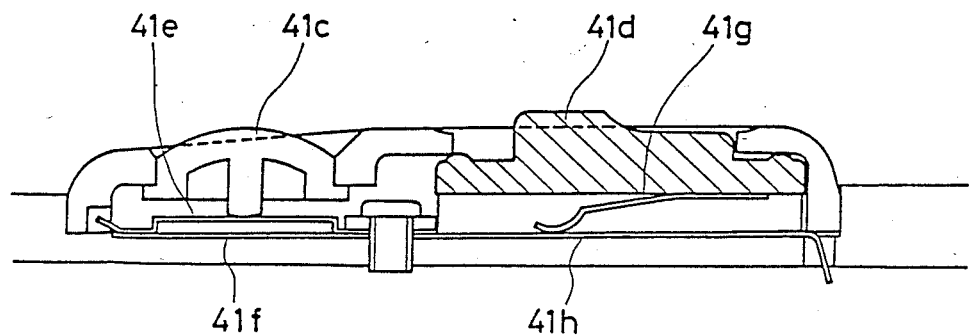
Figure 4:
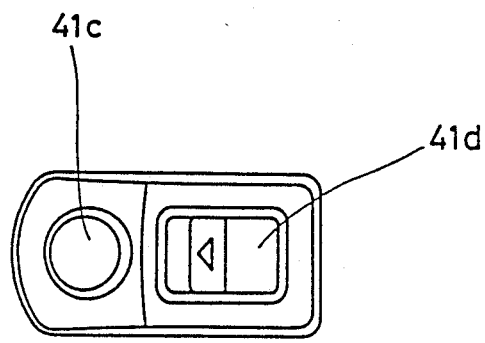

FIGS. 4(a), 4(b) and 4(c) are a partially sectional plan view, a sectional side view and a front view showing the switches 41c, 41d. The switch 41c has a push button. When the button is pushed, a contact spring 41e is deformed to come in contact with a contact pattern 41f. Accordingly, current flows between the ground encoder contact 41a and an input terminal of the external signal $L_{6-2}$, so that the external signal $L_{6-2}$ comes at "L" level. After that, releasing the switch 41c, the switch 41c becomes as it was before deformation by a restoration of the contact spring 41e, and then the ground encoder contact 41a and the input terminal of the external signal $L_{6-2}$ are disconnected so that the external signal $L_{6-2}$ comes at "H" level. The slide switch 41d can slide longitudinally. When the switch 41d slides to the left, a brush 41g attached to the switch 41d slides on a pattern 41h to connect the ground encoder contact 41a with the external signal $L_{6-2}$, so that the external signal $L_{6-2}$ comes at "L" level. After that, releasing the switch 41d, the switch 41d is moved by springs to the right, and then the ground encoder contact 41a and the external signal $L_{6-2}$ are disconnected so that the external signal $L_{6-2}$ comes at "H" level.

TABLE IV

| Relation between the LSW signal and the switches | | | |
|---|---|---|---|
| | | Memory switch | |
| | | OFF | ON |
| Memory Call switch | OFF | $L_5 = 01011$<br>LSW = 00000000 | $L_5 = 01010$<br>LSW = 00000001 |
| | ON | $L_5 = 01001$<br>LSW = 00000010 | $L_5 = 01000$<br>LSW = 00000001 |

TABLE V

| Memory switch | |
|---|---|
| ON | OFF |
| $L_5 = 00110$<br>Manual focusing | $L_5 = 00111$<br>Automatic focusing |

Assuming that LS1 designates the lowest bit of the LSW and LS2 designates the second lower bit, turning off the memory switch 41d makes LS1=0 and turning on it makes LS1=1. Turning off the memory-call switch 41c makes LS2=0 and turning on it makes LS2=1.

Pushing both switches at the same time, the memory switch 41d which is given priority makes LS1=1 and LS2=0. Further, the automatic focusing decision information is also exchanged corresponding to $b_0$ of the external information (terminal) $L_{6-2}$. Contents of the decision information and address signal $L_5$ for selecting the contents are shown in Table V. Accordingly, when the memory switch 41d is turned on, and decision information to set manual focusing is produced.

A camera having the above focus memory system will now be described with reference to a flowchart in FIG. 5.

The chart includes not only the automatic focusing decision but also LS1 decision, because the lens system might not have a focus memory and a focus lock system but have only a focus lock system.

Figure 5:
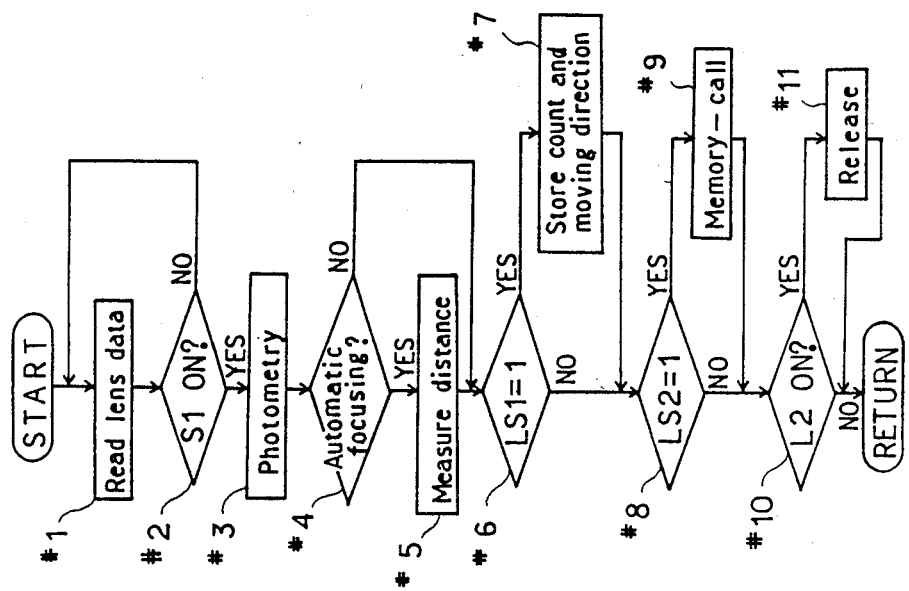
FIG. 5 is a flowchart showing an operation of the camera.

Referring to FIG. 5, the lens data is read at first (#1). When the switch S1 is turned on, i.e. "Yes" at #2, the photometry is carried out (#3). Then, it is judged whether the automatic focusing is available (#4). If "Yes", the distance measurement is carried out (#5). If "No", instead of the distance measurement, it is judged whether LS1=1 (#6). If "Yes" at #6, the register 14 and the flip-flop 15 store a count of the counter and moving direction (#7), and it is judged whether LS2=1 (#8). If "Yes" at #8, tents of a memory is called (memory-call) (#9). After that, when the switch S2 is turned on, i.e. "Yes" at #10, releasing is carried out (#11), and then the step #1 is carried out again.

Figure 6:
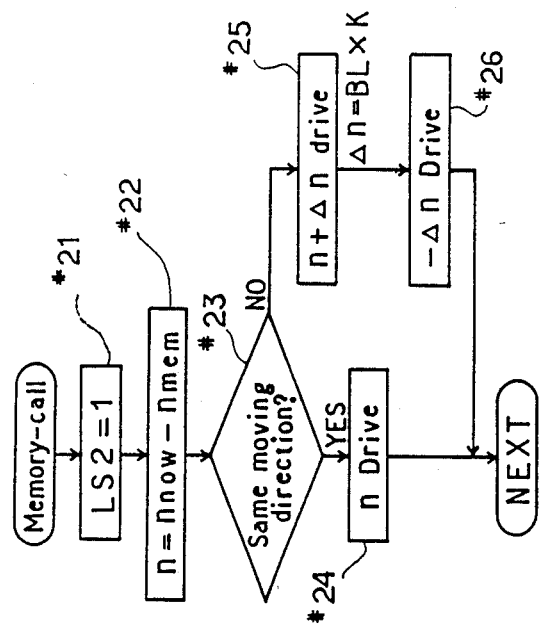
FIG. 6 is a flowchart showing an operation of memory-call.

FIG. 6 shows a flowchart of the memory-call step (#9).

Referring to FIG. 6, if LS2=1, in use of a present position $n_{now}$ in the counter 16 and a stored position $n_{mem}$ in the register 14, $n=n_{now}-n_{mem}$ is calculated (#22). Then, it is judged whether the moving direction is the same as that just before (#23). If the same, driving is carried out by the calculated n and then the next step is carried out. If not the same, the lens is moved by $n+\Delta n$ (#25). Here, $\Delta n=BL$(a backlash amount) X k, where the $\Delta n$ is an amount from a desired position to a driven over position or an overrun amount. The n is calculated with the above formula and data of a backlash amount of each lens which is different from each other. The k is a fixed value and $k \geq 1$. BL is an average in each lens type, whereas a lens may have a BL longer than the average. The reason why $k \geq 1$ is that an error of the backlash amount is surely canceled.

Next, the lens is driven by $-\Delta n$ (#26) and then the next step is carried out.

Figure 7:
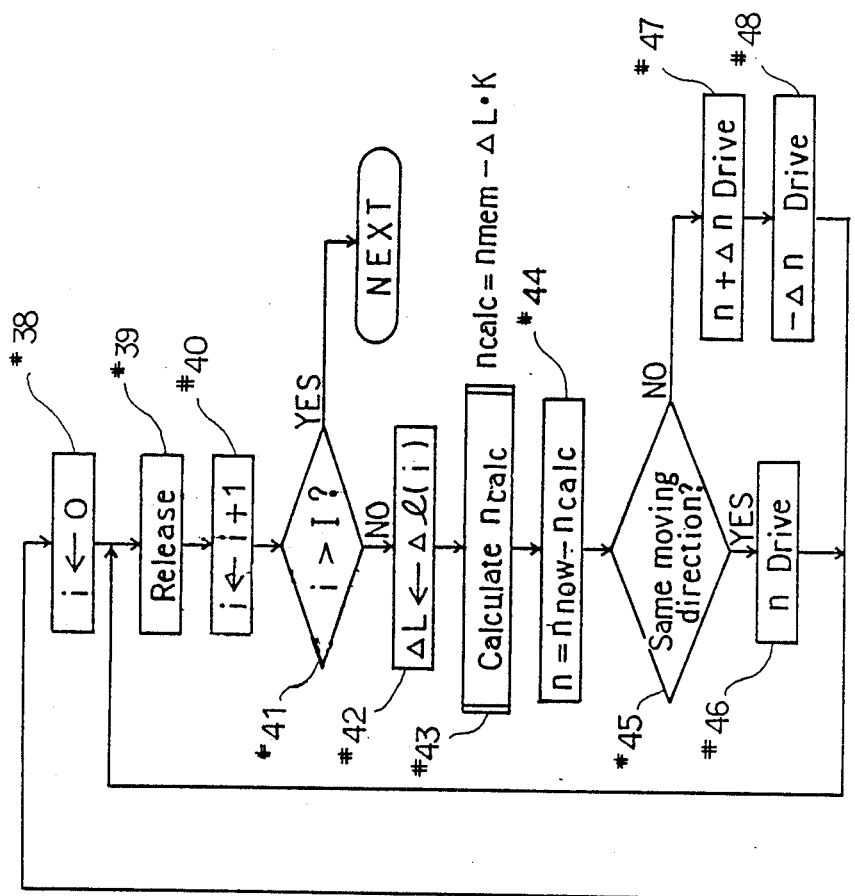
FIG. 7 is a flowchart showing an operation when the camera has focus bracketing mode.
Figure 7:
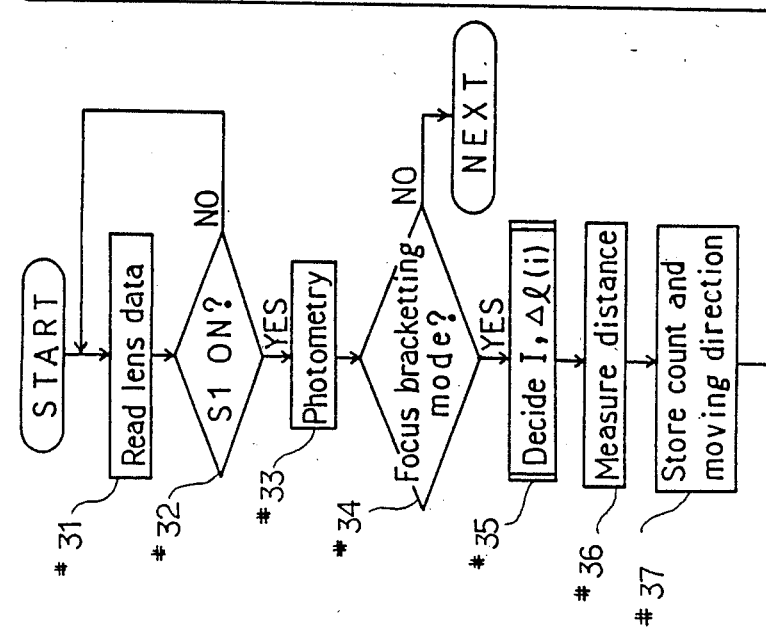

FIG. 7 is a flowchart showing an operation of another embodiment. This is an example of focus bracketing to change a photographing condition with regard to the focal length. That is, after photographing with automatic focusing operation, the lens is defocused by a certain amount $\Delta L$ to taking a next photograph. In the flowchart, #31 to #33 are the same as #1 to #3 in FIG. 5. After that, it is judged whether the focus bracketing mode is set (#34). If "Yes", a number of defocused photographs I and defocusing amount $\Delta l$ (i) of the i-th photograph are decided (#35), and measuring distance to an object is carried out (#36). Successively, the count and moving direction are stored (#37) similar to the above, the i becomes zero (#38), and then a shutter release operation is carried out (#39). Then, the i is incremented by "1" (#40). When i does not becomes larger than I (i.e. "No" at #41), $\Delta l(i)$ is put into $\Delta L$ (#42), and then defocused position $n_{calc}$ is calculated with the following formula (#43). $c_{calc}=n_{mem}-\Delta L X K$ Next, $n=n_{now}-n_{calc}$ is calculated (#44), and #45 to #48 are carried out similar to #23 to #26 in FIG. 6.

After that, the operation gets back to #39 so that the same operation continues.

In the defocusing position calculation, K is the coefficient of lens movement transformation.

Figure 8:
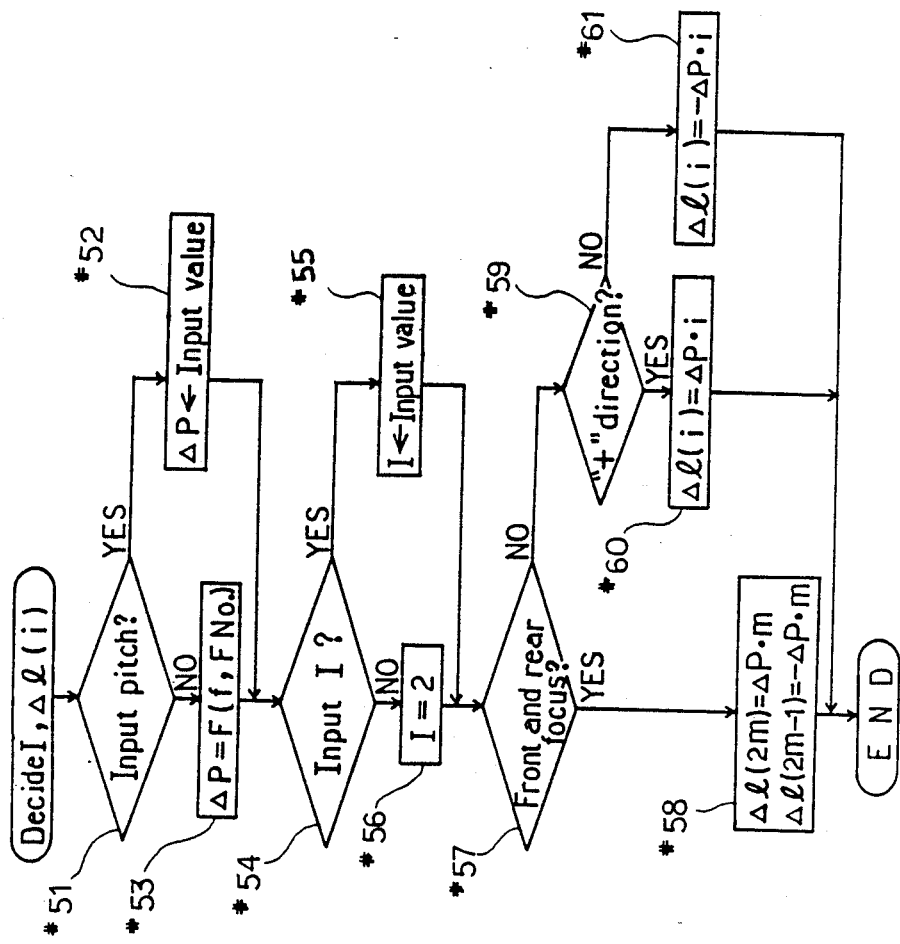
FIG. 8 is a flowchart showing an operation for calculating a sheet number I and Δ(i) in FIG. 7.

FIG. 8 shows a flowchart for calculating the numbers I and $\Delta l(i)$ in #35.

In FIG. 8, first, if a pitch P of the defocus amount is inputted (i.e., "Yes" at #51), the inputted amount is put into $\Delta P$ (#52). If not, $\Delta P=F$ (f, FNo.) is automatically calculated (#53).

Figure 9:
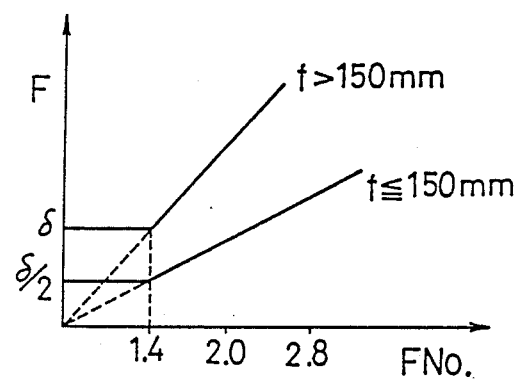
FIG. 9 is a graph showing characteristics of a function F for calculating ΔP in FIG. 8.

This calculation will be described below with reference to FIG. 9. If a photograph number I is inputted (i.e. "Yes" in #54), the inputted number is put into I (#55), while if not, I=2 (#56). After taking a photograph in in-focus condition, it is checked whether a defocused photographing is carried out at front and rear focus positions before and after the in-focus position (#57). If the defocused photographing is carried out at both, $\Delta l$ (2m) and $\Delta l$ (2m−1) are calculated with the formula: $\Delta l$ (2m)=$\Delta P X m$ and $\Delta l(2m-1)=-\Delta P X m$ where m is a natural number, 2m and 2m−1 are an even number and an odd number of photograph, respectively, less than I. When the photographing is carried out only at one position, the lens is moved by $\Delta P$ forward or backward. In this case, it is checked whether the direction is "+" (#59). When in "+" direction, $\Delta l(i)$ is calculated with a formula: $\Delta l(i)=\Delta P X i$ (#60). When not in "+" direction, $\Delta l(i)$ is calculated with a formula: $\Delta l(i)=-\Delta P X i$ (#61).

Calculation of $\Delta P$ at #52 will be described with reference to FIG. 9.

F(f, FNo.) is a function of the focal length f and the F-number FNo. In FIG. 9, $\delta D$ is a depth of focus at F1.4.

A line (f≤150 mm) is set at $\delta \Delta/2$ in pitch, because a fine focusing is necessary in portrait photographing. A line (f>150 mm) is set as rough as possible in pitch, because a focal point changes only a little comparing with a defocusing amount when the focal distance is long. However, function F becomes constant in a range where FNo. is smaller than F1.4, so that a control amount does not become too small.

According to the above characteristics, obtaining a function F(f, FNo.) makes an amount of overrun small in a camera which has a small backlash, so that the camera can be operated rapidly.

While there has been illustrated and described a preferred embodiment of the present invention, it will be understood that various changes and modifications may be made, and equivalents may be substituted for elements thereof without departing from the scope of the invention.

What is claimed is:

1. A lens driving device for driving a focusing lens to stop said focusing lens at a desired position, comprising;
    means, including a driving mechanism having a backlash, for driving said focusing lens along an optical axis thereof;
    means for detecting a moving direction of said focusing lens;
    means for storing a reference position of said focusing lens;
    means for storing a moving direction of said focusing lens immediately before said focusing lens is stopped at said reference position;
    means for comparing a present moving direction according to said moving direction detecting means with said stored moving direction; and
    means for controlling said driving means so that said focusing lens moves through said desired position by a predetermined amount not less than the amount of said backlash, and said focusing lens reversely moves by said predetermined amount when said comparing means detects that said present moving direction is different from said stored moving direction.

2. A device according to claim 1, further comprising means for continuously detecting a position of said focusing lens to continuously provide a position signal corresponding to the detected position of the focusing lens, wherein said moving direction detecting means detects the moving direction in accordance with at least two of said position signals.

3. A device according to claim 2, wherein said reference position storing means includes an operable member, and means for storing said reference position in accordance with a position signal provided when said operable member is operated.

4. A device according to claim 1, further comprising means for automatically detecting an in-focus position of said focusing lens, wherein said reference position storing means includes means for storing said in-focus position as said reference position.

5. A device according to claim 4, wherein said reference position storing means further includes means for storing a front focus position of said focusing lens apart from said in-focus position by a predetermined distance and a rear focus position of said focusing lens apart from said in-focus position by the predetermined distance.

6. A camera system comprising;
    a camera body;
    a plurality kinds of interchangeable lenses selectively mountable on said camera body;
    means for detecting a type of said interchangeable lens mounted on said camera body;
    means, including a driving mechanism having a backlash, for driving a focusing lens included in the mounted interchangeable lens along an optical axis of said focusing system;
    means for determining an amount of said backlash in accordance with the type detected by said type detecting means;
    means for detecting a moving direction of said focusing lens;
    means for storing a reference position of said focusing lens;
    means for storing a moving direction of said focusing lens immediately before said focusing lens is stopped at said reference position;
    means for comparing a present moving direction according to said moving direction detecting means with said stored moving direction; and
    means for controlling said driving means so that said focusing lens moves through a desired position by a predetermined amount not less than the amount of said backlash, and said focusing lens reversely moves by said predetermined amount when said comparing means detects that said present moving direction is different from said stored moving direction.

* * * * *